W. SCHROEDER.
CLAMP.
APPLICATION FILED MAR. 19, 1912.
1,084,712.
Patented Jan. 20, 1914.
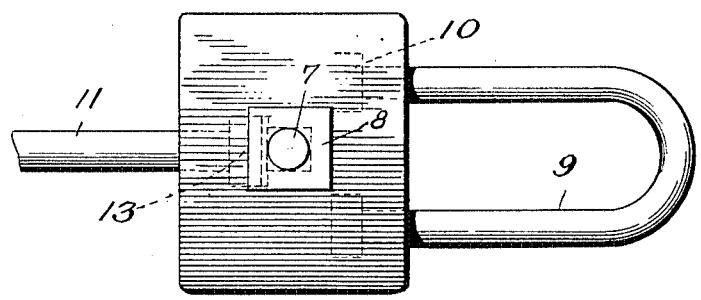
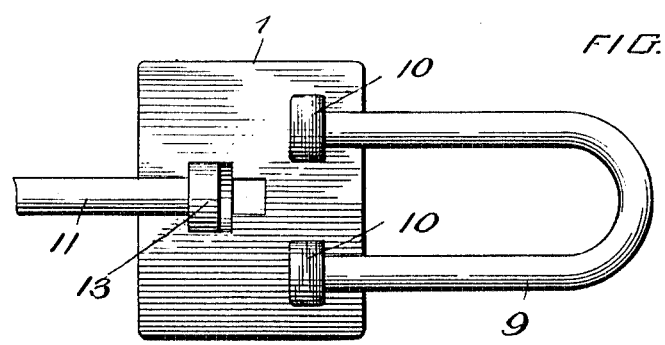
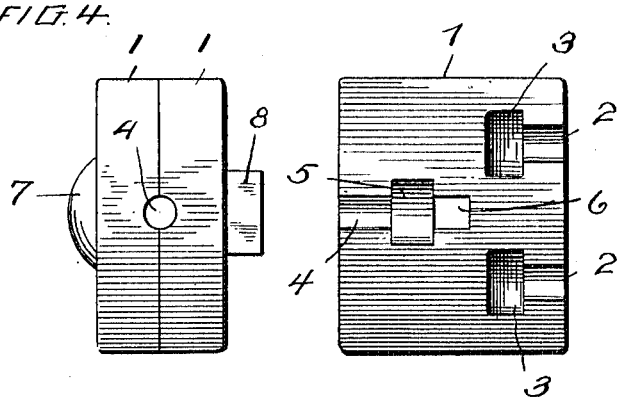 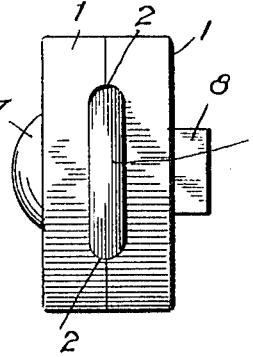
WITNESSES:
INVENTOR
William Schroeder.
BY
Attorney

UNITED STATES PATENT OFFICE.

WILLIAM SCHROEDER, OF DEWEY, OKLAHOMA.

CLAMP.

1,084,712.  Specification of Letters Patent.  Patented Jan. 20, 1914.

Application filed March 19, 1912. Serial No. 684,908.

*To all whom it may concern:*

Be it known that I, WILLIAM SCHROEDER, a citizen of the United States, residing at Dewey, in the county of Washington and State of Oklahoma, have invented certain new and useful Improvements in Clamps, of which the following is a specification.

This invention relates to coupling connections employed in pumps such as are used on the end of pull rods for pumping oil wells and for other similar uses.

The invention has for its object to provide a simple, strong and durable combination clamp to be used with pump rods in which one bolt may be employed instead of four.

With the above and other objects in view, this invention consists in the construction, arrangement and combination of parts, all as hereinafter more fully described, claimed and illustrated in the accompanying drawings, in which:—

Figure 1 is a view of the combination clamp constructed in accordance with this invention. Fig. 2 is a view of the clamp with one of the clamping plates removed. Fig. 3 is a detail view of one of the clamping plates. Fig. 4 is an end view of the clamp with the link and bolt removed. Fig. 5 is an end view of the device shown in Fig. 1.

In carrying out the invention a pair of metallic clamping plates 1, shown as rectangular, are employed. Each of the plates 1 is formed at one end with a pair of semicircular passageways 2 terminating in a transverse recess 3, said passageways and recesses being located adjacent to each end of the plate 1. The plate 1 is further provided in its opposite end with a semi-circular passageway 4 extending into the plate about half way therein, and with a transverse recess 5 extending across said passageway 4, the latter being located upon one side of the center of the plate. When the two plates so constructed are placed together as shown in Figs. 1 and 4, the passageways and the recesses in each plate will coincide, and together form holes with the transverse sockets across each hole. The plates are clamped together by means of a bolt hole 6 centrally located in each plate and a headed bolt 7 passing through said hole and provided with clamping nut 8. Secured between said plates and one end thereof is a metallic loop or link 9 provided at its ends with circular heads or lugs 10 which are seated in the sockets formed by the alining recesses 3, the arms of the link 9 extending through the holes formed by the alining passageways 2. Secured to the opposite end of the clamping plates between the same is one end of a rod 11 which projects into the hole formed by the semi-circular passageways 4 in said plates and has formed upon the inner end thereof a head 13 located in the socket formed by the alining recesses 5 in the plates 1.

The ends of the link 9 and the end of the rod 11, with its head 13 being located between the plates 1 and clamped thereby are held securely in place by means of the bolt 7 and nut 8.

It will be seen by the foregoing construction that a strong and effective clamp is provided for clamping together a link and a bolt and that a simple construction is afforded wherein only a single bolt is employed.

Having thus fully described my invention, what I claim as new and desire to secure by Letters Patent of the United States is:

A clamp consisting of a pair of metallic plates each provided with a bolt hole in the center thereof, and at one end a pair of semi-circular passageways with a transverse recess therein, a U-shaped link provided with a head on each end thereof and adapted to seat in said passageways, the other end of said plates being provided with a passageway and having a transverse recess formed in the end thereof, and a rod seated in said passageway provided with a head on the end thereof and said head being of smaller length than the transverse recess, allowing for lost motion of said rod, and a bolt passing through the hole in said plates adapted to secure the plates in registration with each other.

In testimony whereof I affix my signature in presence of two witnesses.

WILLIAM SCHROEDER.

Witnesses:
 B. A. LEWIS,
 W. L. CUSHENBERG.